United States Patent [19]

Wiesemann

[11] Patent Number: 5,034,122
[45] Date of Patent: Jul. 23, 1991

[54] SELF CLEANING STATIC BAR GRID
[75] Inventor: Bruce O. Wiesemann, Largo, Fla.
[73] Assignee: Wiesemann Enterprises, Inc., Largo, Fla.
[21] Appl. No.: 557,154
[22] Filed: Jul. 20, 1990
[51] Int. Cl.⁵ .............................................. E02B 5/08
[52] U.S. Cl. .................................... 210/162; 210/173; 209/205; 209/906; 100/110; 100/126
[58] Field of Search ............... 210/154, 155, 158, 162, 210/389, 159, 173; 209/259, 906; 100/110, 126

[56] References Cited
U.S. PATENT DOCUMENTS 2,839,197  6/1958  Nordell .............................. 210/162
3,123,558  3/1964  Sullivan .............................. 210/389
3,836,463  9/1974  Teague et al. ...................... 210/162
4,846,966  7/1984  Pastore .............................. 210/162

Primary Examiner—W. Gary Jones
Assistant Examiner—David Reifsnyder
Attorney, Agent, or Firm—Herbert W. Larson

[57] ABSTRACT

A bar grid is formed with multiple vertical rods supporting multiple horizontal roll formed elements with a flange at a front edge of each element. The grid is mounted in a water effluent stream on each side of a solid filter screen or grinder and funnels solid material down to the compactor without buildup of solids on the grid screen.

7 Claims, 3 Drawing Sheets

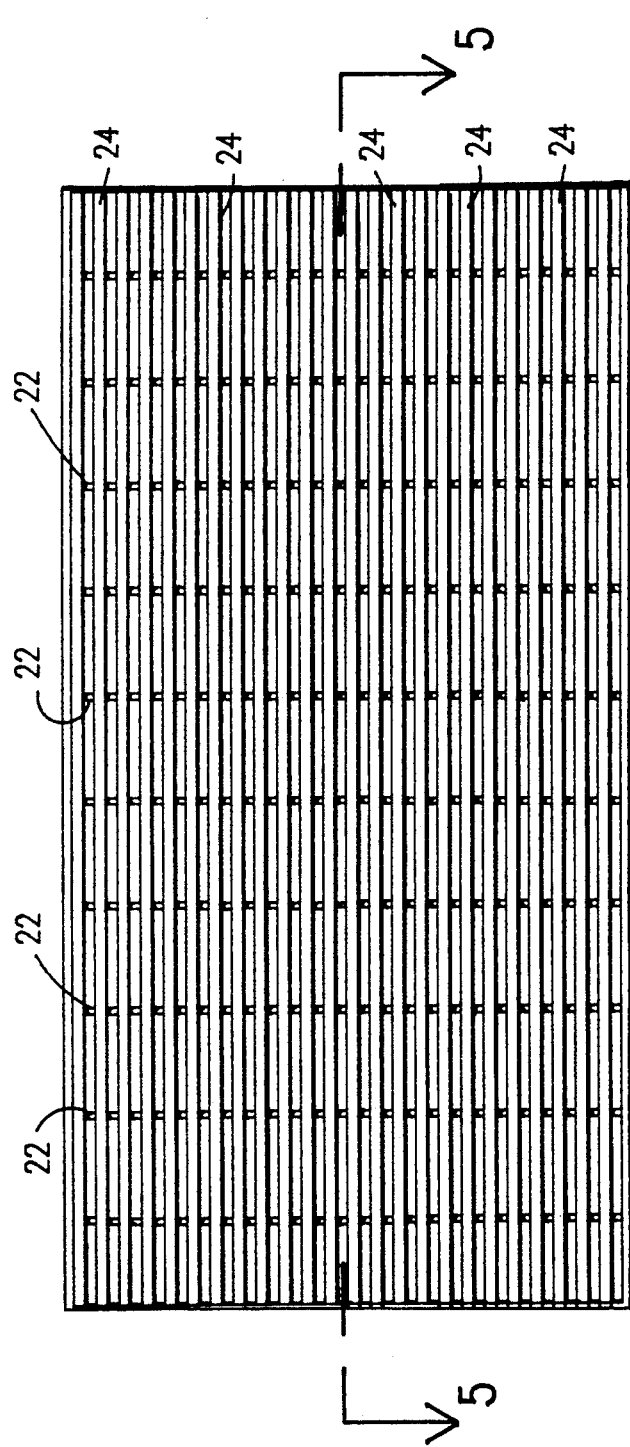
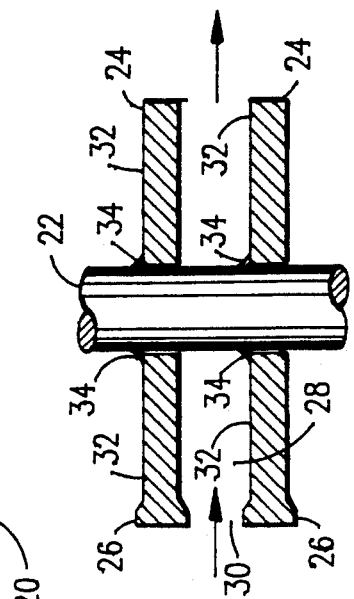
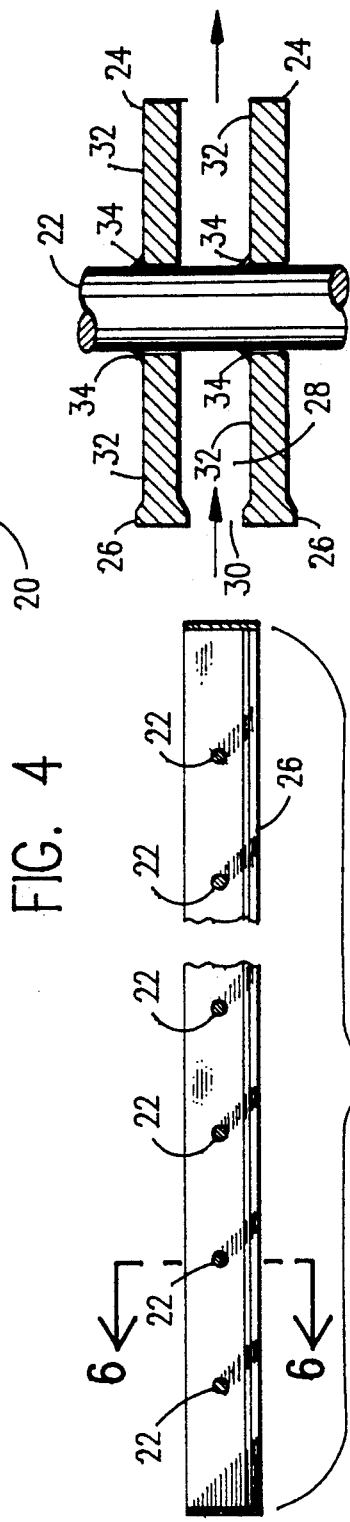

SELF CLEANING STATIC BAR GRID

BACKGROUND OF THE INVENTION

1. Field of the Invention

This invention relates to bar grids used in waste water intake structures. More particularly, it refers to a self cleaning static bar grid which concentrates solid effluent prior to receipt by a filter screen apparatus.

2. Description of the Prior Art

Bar grid screens used to concentrate solid particles in waste water effluent streams frequently incur the problem of solids build-up on the screen grid with the consequent loss of head and in extreme cases partially blockage of the grid so that the screen acts as a dam. Many solutions have been suggested such as in U.S. Pat. No. 2,839,197, wherein a plurality of spaced parallel flat metallic ribbons are subjected to longitudinal tension so that the load carrying capacity of the screen is increased. This type of screen permits cleaning by a simple apparatus. In U.S. Pat. No. 3,123,558, the longitudinal members are constructed to minimize elongate materials being retained on the screen. A shaking motion is imparted to the screen for advancing debris across the screen to a discharge point. In U.S. Pat. No. 3,836,463, a mechanical rake is oriented on the face of a bar grid. The rake moves up and down in response to a motor. All of these prior art patents describe bar grid screens requiring some kind of separate cleaning action on closely spaced bars located in a vertical configuration.

A self cleaning bar grid screen is needed which will concentrate solid particles from waste water effluent streams and move them into a compactor without allowing the build-up of solid debris on the grid screen.

SUMMARY OF THE INVENTION

I have invented a self cleaning static bar grid which allows liquids to pass between multiple horizontal roll formed elements and causes solids to roll along the effluent stream to a solid filter screen and compactor.

My grid has several vertical support rods and multiple closely spaced horizontal roll formed elements with a flange at a front edge. The grid is mounted in a water effluent stream on each side of a solid filter screen or grinder and funnels solid material down to the compactor without build-up of solids on the grid screen.

BRIEF DESCRIPTION OF THE DRAWINGS

The invention may be best understood by those having ordinary skill in the art by reference to the following detailed description when considered in conjunction with the accompanying drawings in which:

FIG. 4 is a front elevation view of the static bar grid panel.

FIG. 5 is a view through lines 5—5 of FIG. 4 of a section of the bar grid.

FIG. 6 is a cross section view through lines 6—6 in FIG. 5.

DETAILED DESCRIPTION OF THE INVENTION

Figure 1:
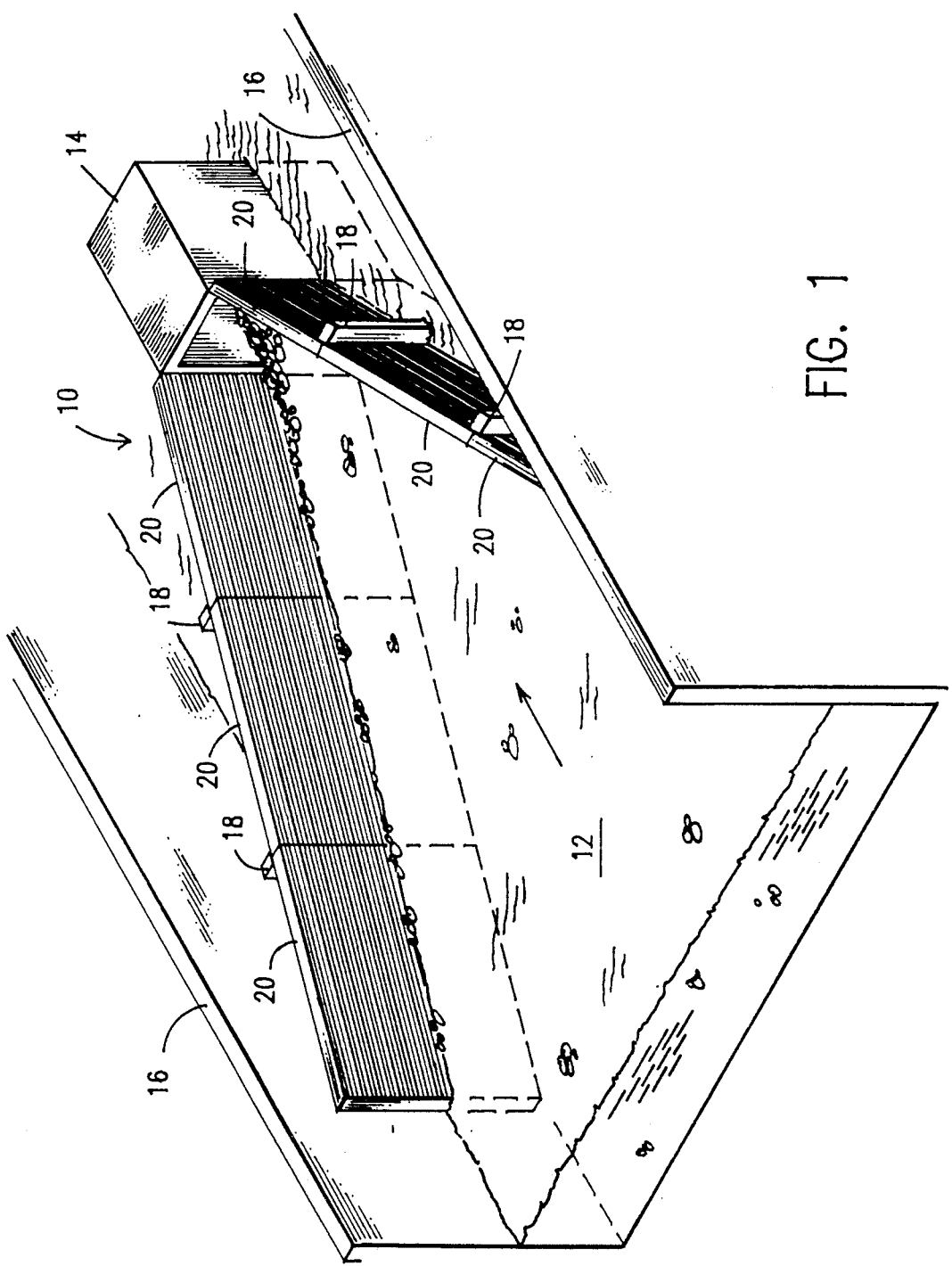
FIG. 1 is a perspective view of the static bar grid of the invention located in a waste water effluent stream.

Throughout the following detailed description, the same reference numerals refer to the same elements in all figures.

The bar grid 10 in a water effluent stream 12 and constructed in a manner to form a funnel towards a compactor 14 is located within concrete channel walls 16 as shown in FIG. 1.

Pilings 18 support the bar grid sections 20. Each bar grid section 20 as shown in FIG. 4 has multiple vertical rods 22 supporting multiple closely spaced apart horizontal roll formed elements 24. Each of the roll formed elements has a front flange 26 which prevents the build-up of large particles in the space 28 between each roll formed element 24. As seen in FIG. 6, a gap 30 between flanges 26 is narrower than the gap 28 between the roll formed elements 24.

Solid debris moving along stream 12 towards the compactor 14 strikes the flange 26 and is then deflected along the edge of the grid panel 20 and rolls forward with the water pressure behind it to the compactor 14. Water and small particles pass between the roll formed elements 24 and through space 28.

In the construction of a grid 20, the vertical rods 22 are usually about ⅜ inches in diameter and are made of a high strength stainless steel. The roll formed element 24 is also made of stainless steel from a roll formed flat bar and has a gap 28 between each roll formed element 24 of about 0.060 of an inch more than the gap 30 between flanges 26. The flange 26 is approximately 0.195 of an inch in thickness and the roll formed element 24 itself is approximately 0.135 of an inch in thickness. The gap 30 between the flanges 26 can vary as required by the type of effluent to be screened. Accordingly, the gap 30 can be ¼ of an inch all the way to 1 inch in diameter.

The panel 20 is usually about 60 inches high and the space between rods 22 is about 12 inches. For convenience, each panel is approximately 120 inches in width. An end plate can be installed on the outer edge of each grid 20. A panel of these dimensions will weigh about one thousand pounds.

The filtered effluent passes through the space 28 and continues on through the effluent stream 12 between the concentrate sidewalls 16. The compactor 14 can be a screen assembly containing a compactor as described in U.S. Pat. No. 4,812,231, which is herein incorporated by reference.

The horizontal roll formed elements 24 are welded to the vertical rods 22 so that the roll formed elements 24 provide a curved edge between rod 22 and the upper surface 32 of each roll formed element. The weld 34 can be seen in FIG. 6.

Figure 2:
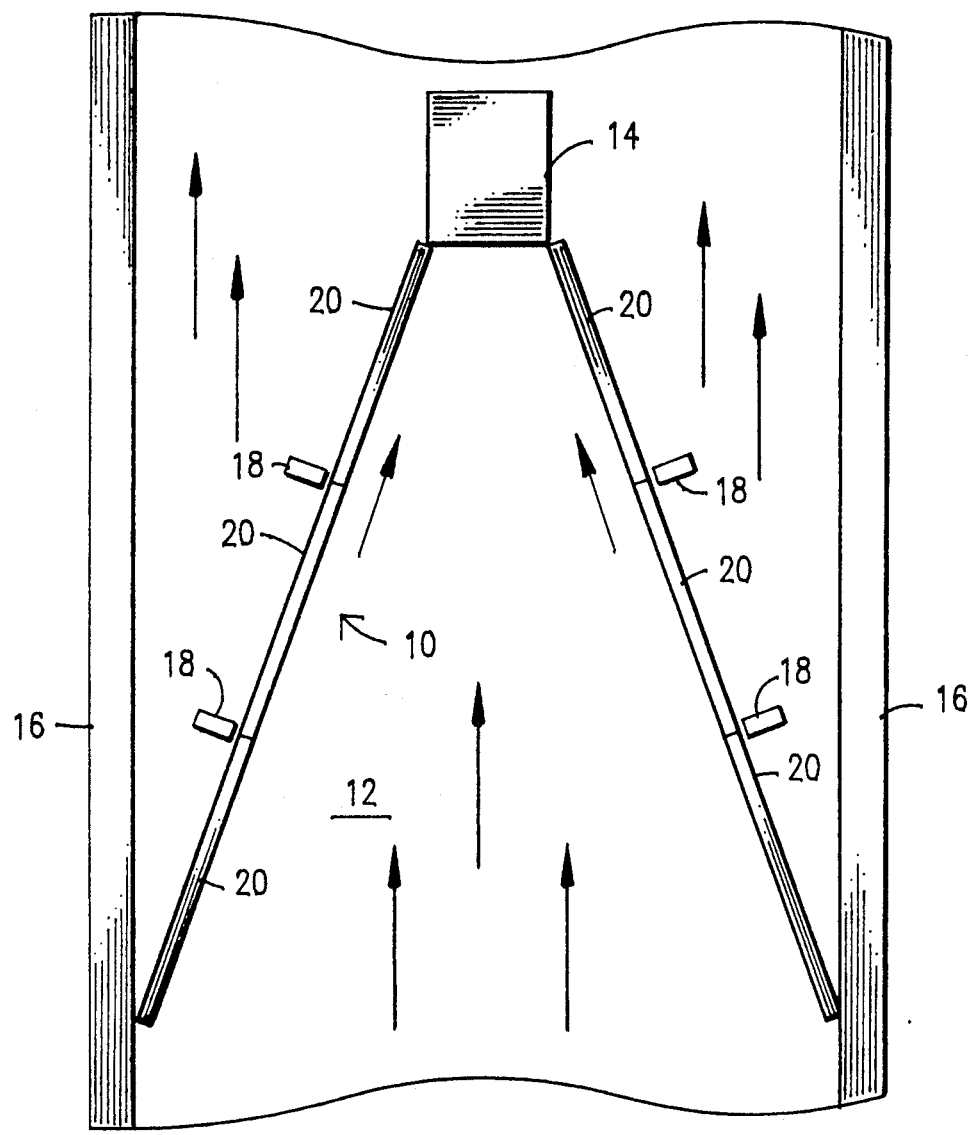
FIG. 2 is a top plan view of the static bar grid located in a waste water effluent stream.
Figure 3:
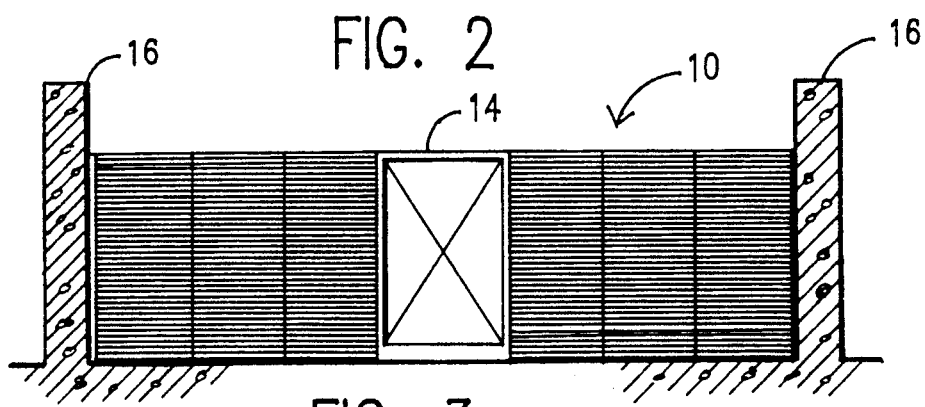
FIG. 3 is a front elevation view of the static bar grid located on each side of a filter screen apparatus.

Positioned about six of the grid sections 20 on each side in the funnel configuration shown in FIG. 2 provides a pattern wherein water pressure of about three feet per second in the effluent stream 12 acts to push the solids further down the stream 12. As the solids approach the compactor 14, the pressure is increased by the funnel configuration to keep the solids moving forward. The angle of the bar grids 20 to the compactor 14 does not exceed twenty degrees in a water effluent channel about twenty feet long and having a width of about ten feet.

Having thus described the invention what is claimed and desired to be secured by Letters Patent is:

1. A static bar grid located in the down stream flow of a water effluent stream comprising multiple closely spaced apart horizontal roll formed flat metal bars supported by vertical rods to form a grid panel, a front edge of each horizontal bar having a flange to create a diminished space between the horizontal bars in relation to the space between the remainder of each horizontal bar, multiple grid panels being attached together and located on each side of the effluent stream to form a funnel configuration with a wide mouth of the funnel upstream and a narrow end downstream leading to a solid waste compactor, the panels in the funnel configuration being at an angle of less than twenty degrees to the solid waste compactor and means for supporting the grid panels in the water effluent stream.

2. The static bar grid according to claim 1 wherein the vertical space between the flanges on adjacent horizontal bars is between one-quarter to one inch.

3. The static bar grid according to claim 2 wherein the space between each flange on the horizontal bars is at least 0.06 inch less than the vertical space between each horizontal bar.

4. The static bar grid according to claim 1 wherein the horizontal bars are welded to the vertical rods.

5. The static bar grid according to claim 1 wherein there are up to six grids on each side of the water effluent stream with the stream having a velocity of up to three feet per second in a channel about ten feet wide.

6. The static bar grid according to claim 1 wherein the means for supporting the grip panels are spaced apart pilings located outboard of the grid with respect to the water effluent stream.

7. The static bar grid according to claim 1 wherein the flat metal bars are made from stainless steel.

* * * * *